Figure 1:
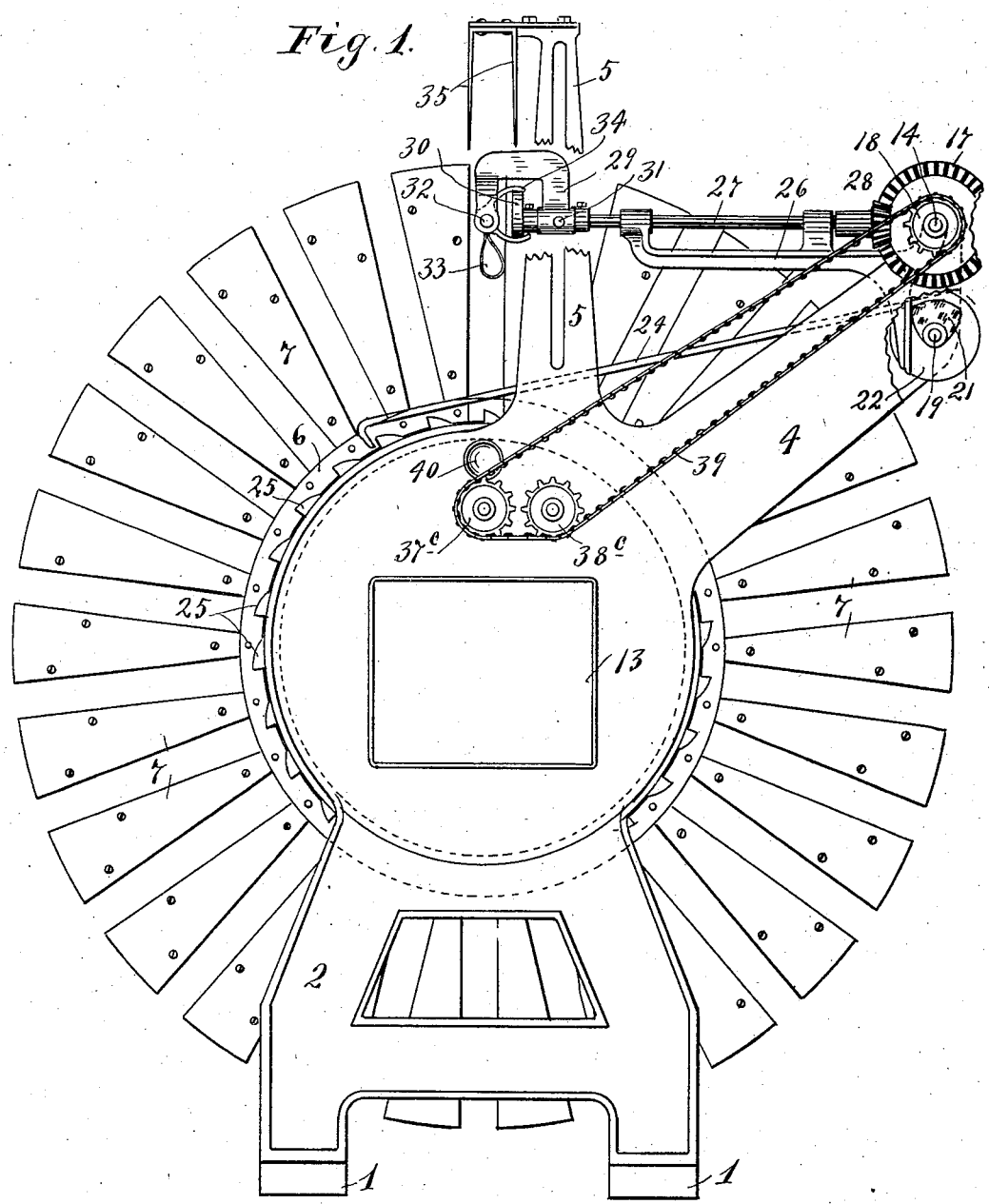

No. 721,360. PATENTED FEB. 24, 1903.
E. R. DRAVER.
DUST COLLECTOR.
APPLICATION FILED MAR. 13, 1902.
NO MODEL. 6 SHEETS—SHEET 1.

Witnesses.
A. M. Opsahl.
H. D. Kilgore

Inventor.
Emil R Draver
By his Attorneys.
Williamson & Merchant

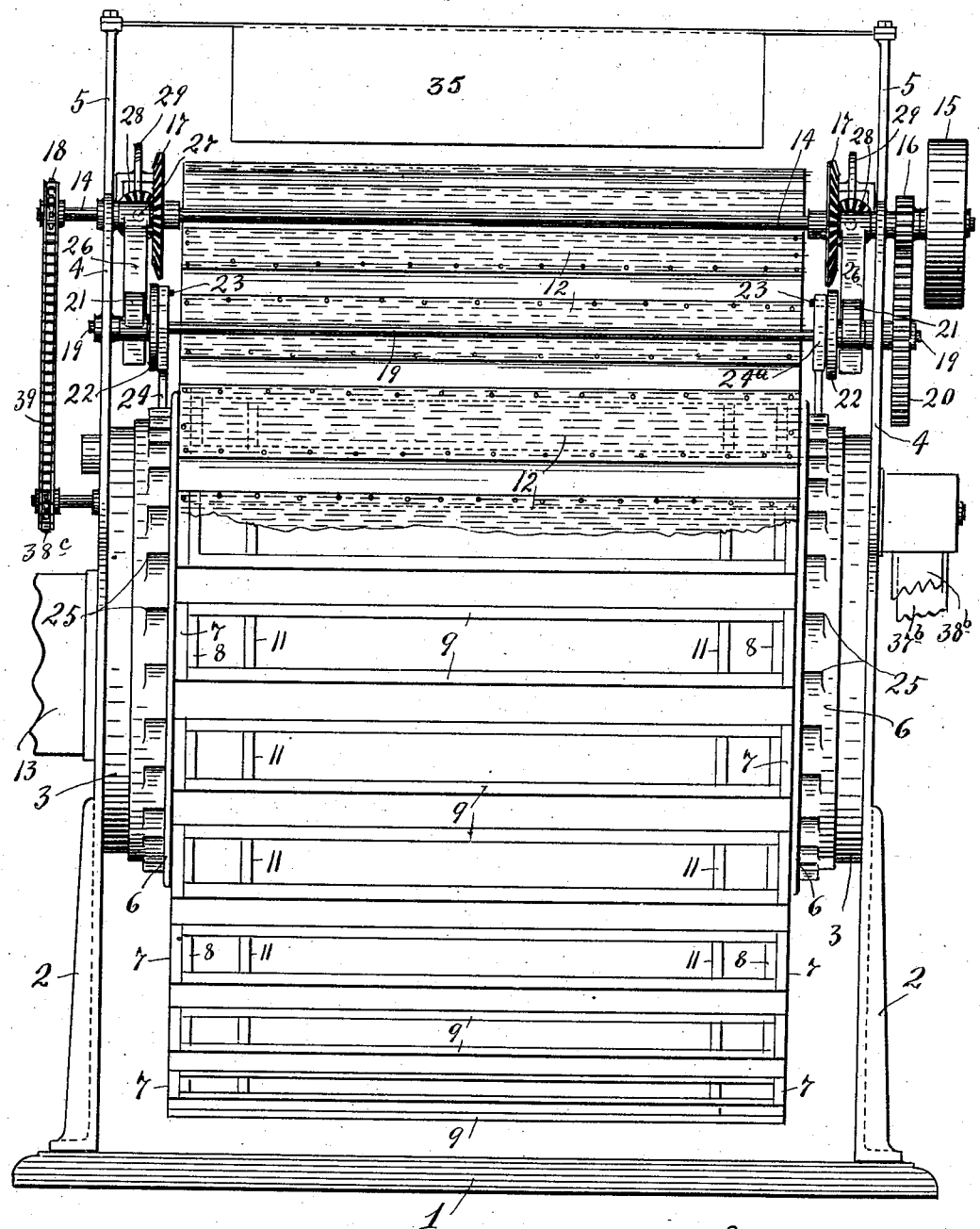

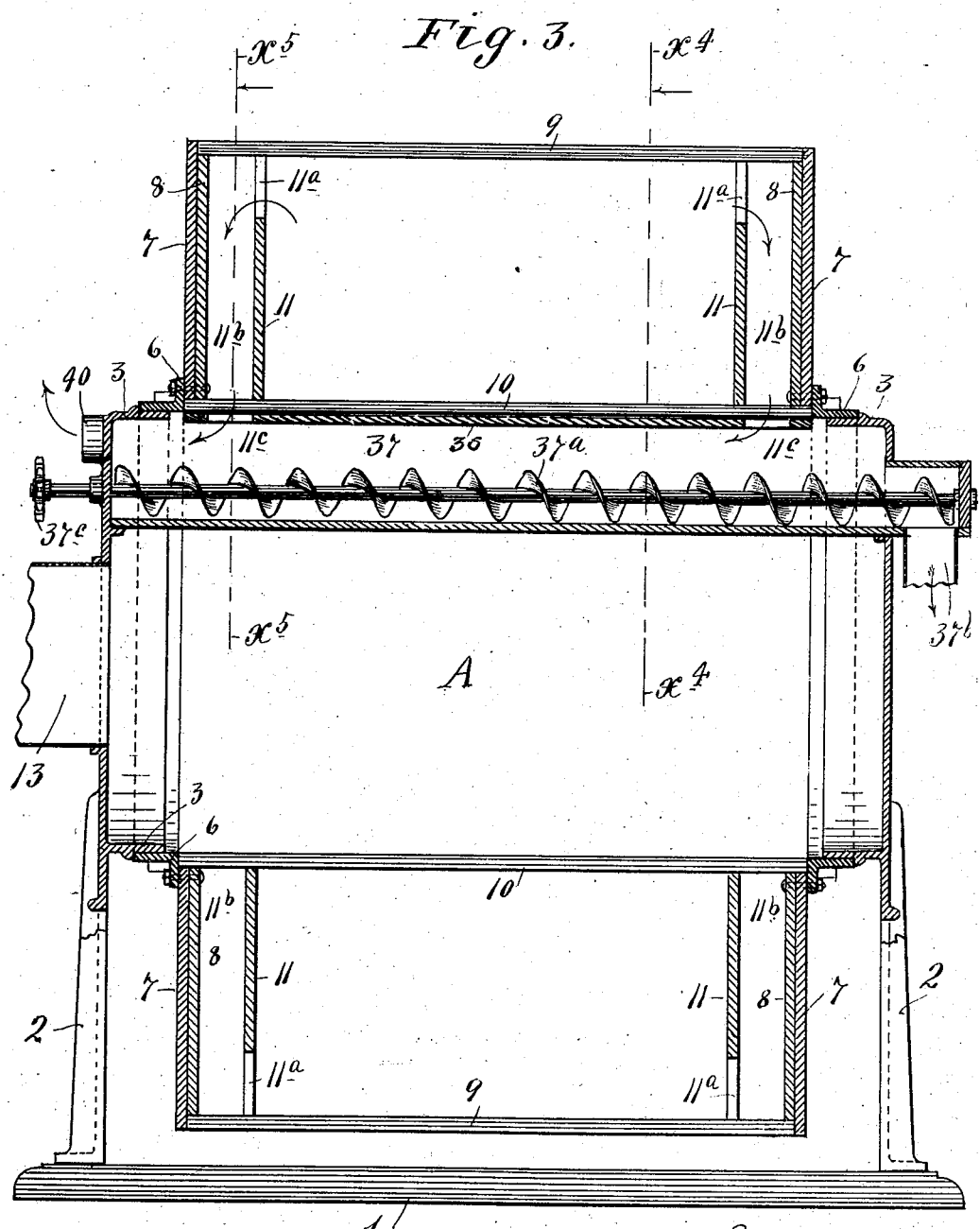

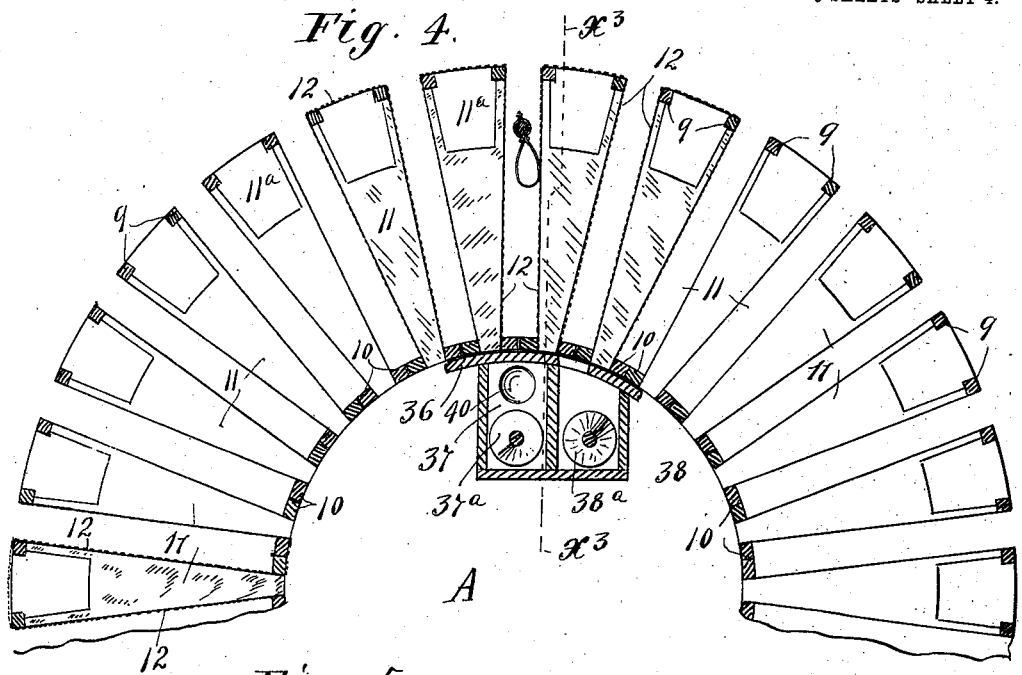
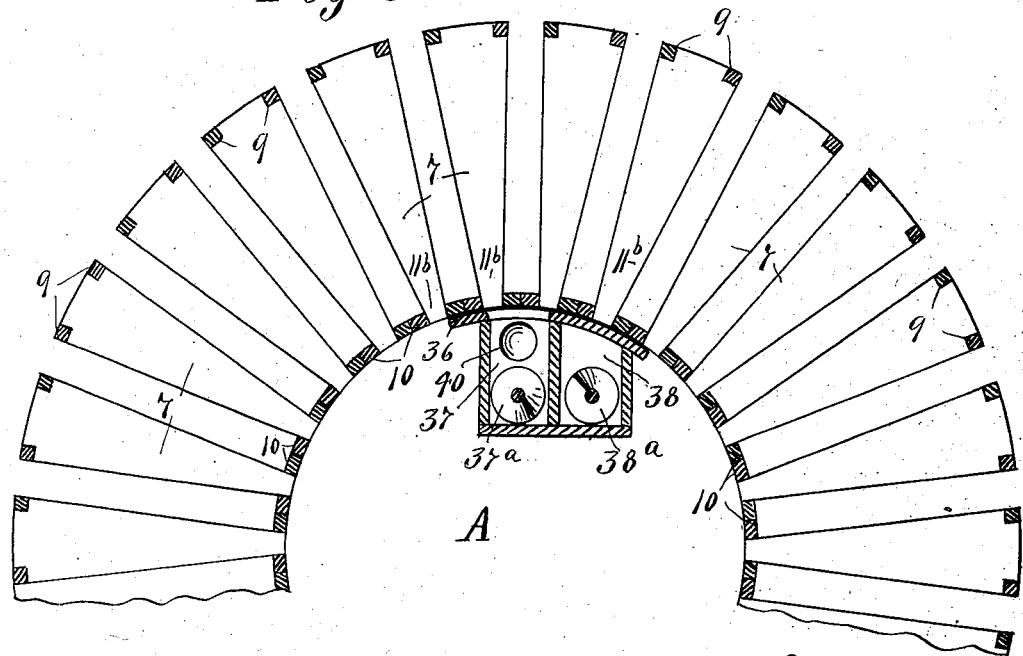

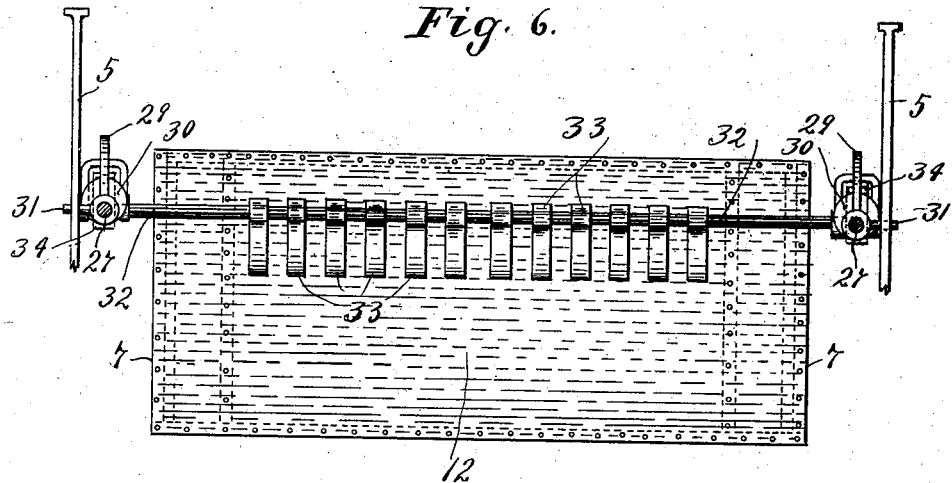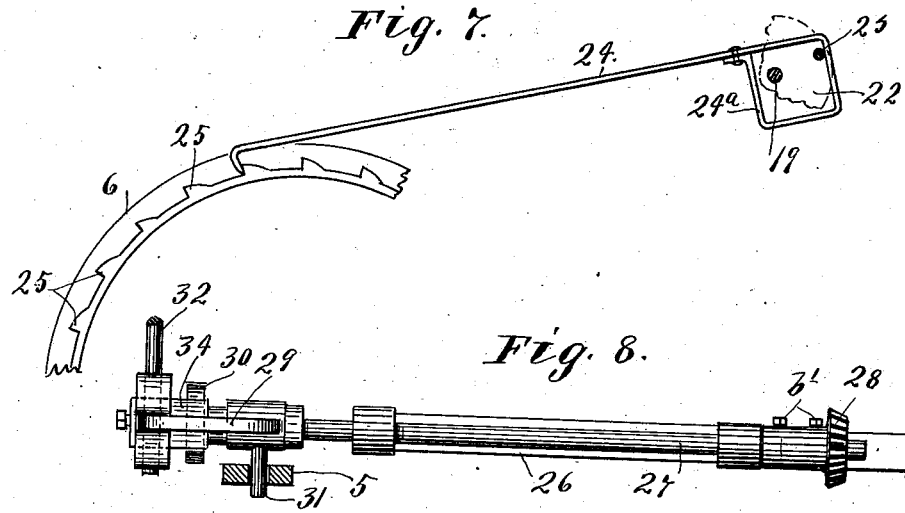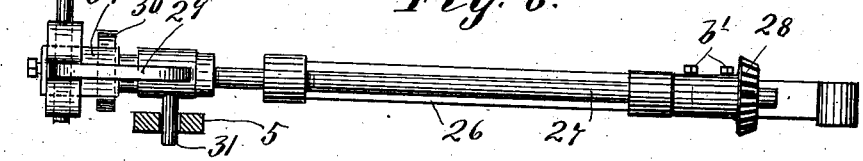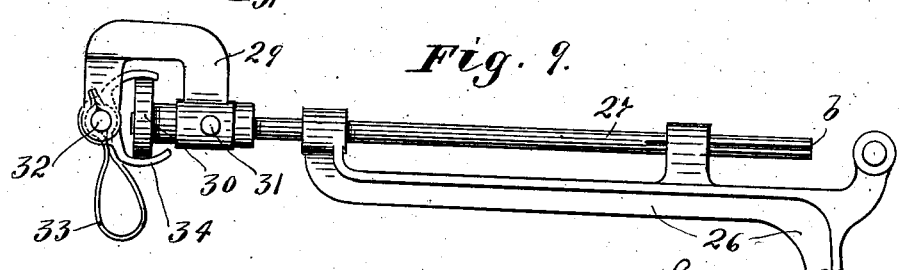

No. 721,360. PATENTED FEB. 24, 1903.
E. R. DRAVER.
DUST COLLECTOR.
APPLICATION FILED MAR. 13, 1902.
NO MODEL. 6 SHEETS—SHEET 6.
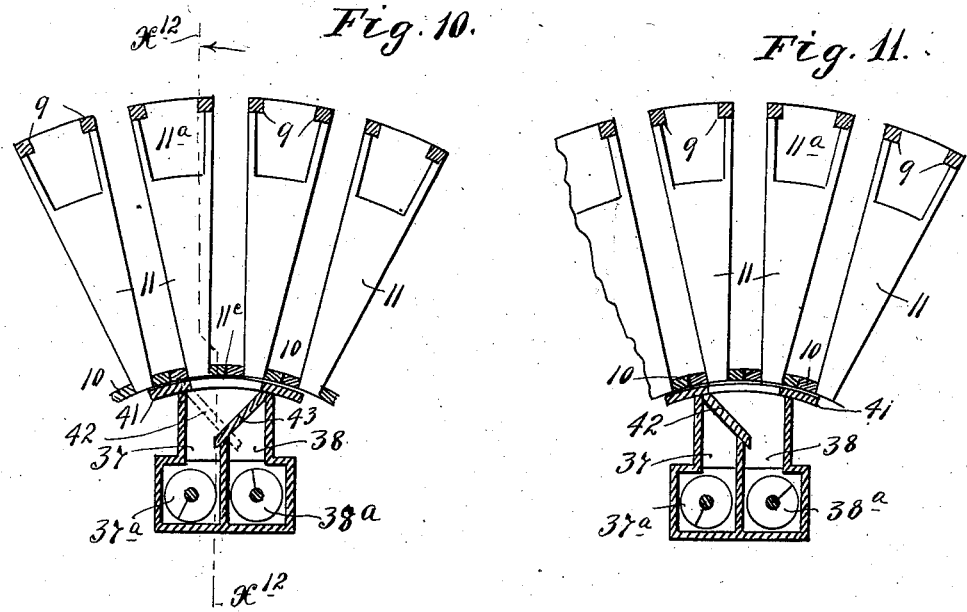
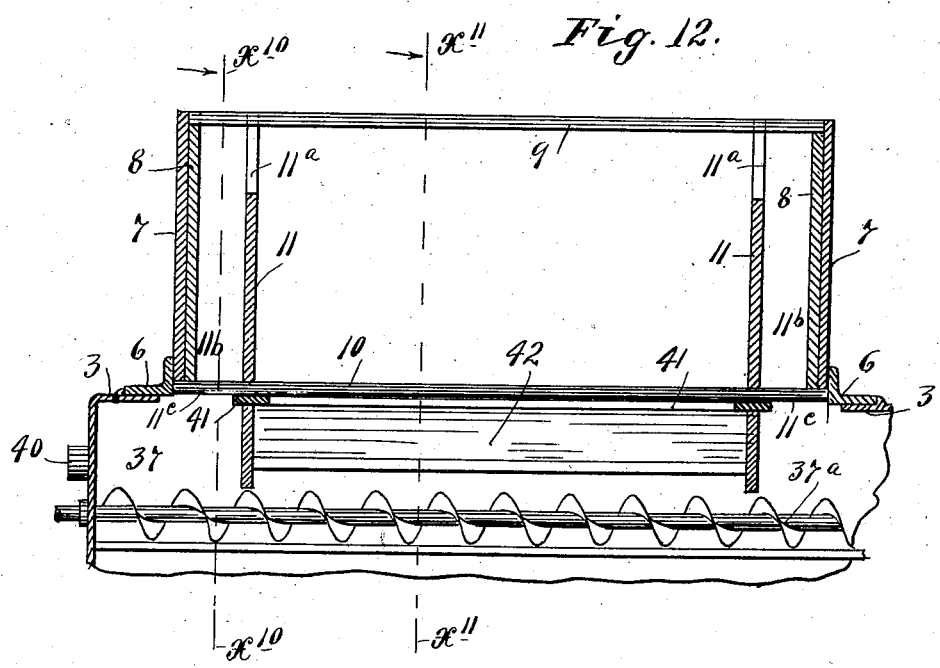
Witnesses.
A. H. Opsahl.
H. D. Kilgore.
Inventor.
Emil. R. Draver.
By his Attorneys.
Williamson & Merchant

UNITED STATES PATENT OFFICE.

EMIL R. DRAVER, OF RICHMOND, INDIANA.

DUST-COLLECTOR.

SPECIFICATION forming part of Letters Patent No. 721,360, dated February 24, 1903.

Application filed March 13, 1902. Serial No. 98,040. (No model.)

*To all whom it may concern:*

Be it known that I, EMIL R. DRAVER, a citizen of the United States, residing at Richmond, in the county of Wayne and State of Indiana, have invented certain new and useful Improvements in Dust-Collectors; and I do hereby declare the following to be a full, clear, and exact description of the invention, such as will enable others skilled in the art to which it appertains to make and use the same.

My invention relates to dust-collectors of the balloon type, and has for its object to provide certain improvements therein with a view of securing increased efficiency.

To this end my invention consists of the novel devices and combinations of devices hereinafter described, and defined in the claims.

The invention is illustrated in the accompanying drawings, wherein like notations refer to like parts throughout the several views.

In said drawings, Figure 1 is an end elevation showing my improved dust-collector with some parts broken away. Fig. 2 is a right-side elevation with respect to Fig. 1, with some parts removed and others broken away. Fig. 3 is a longitudinal central vertical section on the irregular line $x^3 x^3$ of Fig. 4. Fig. 4 is a cross-section through a part of the machine on the line $x^4 x^4$ of Fig. 3. Fig. 5 is a similar cross-section on the line $x^5 x^5$ of Fig. 3. Fig. 6 is a detail in elevation, showing the relation of the cleaner to one of the filtering-pockets. Fig. 7 is a detail showing part of the devices for imparting an intermittent rotary motion to the drum. Fig. 8 is a plan view or detail showing means for supporting and operating the cleaning device with some parts removed and others shown in section. Fig. 9 is a side elevation of the parts shown in Fig. 8. Fig. 10 is a view in cross-section on the line $x^{10} x^{10}$ of Fig. 12. Fig. 11 is a similar view on the line $x^{11} x^{11}$ of Fig. 12, and Fig. 12 is a view on the irregular line $x^{12} x^{12}$ of Fig. 10. Said Figs. 10, 11, and 12 illustrate modifications.

To a pair of cross-ties or base-plates 1 are fixed a pair of frame-plates 2. The frame-plates 2 are of circular form in their upper portion and are provided with inwardly-extended shouldered annular flanges 3 of suitable form to afford the fixed bearings for the rotary reel. The frame-plates 2 are also provided with bearing-brackets 4 and slotted guide-brackets 5, all of which extend radially outward to points beyond the periphery of the reel. Annular castings 6, of angular form in cross-section, constitute the hubs of the reel, and the horizontal portions thereof turn on the fixed bearings 3. To the hub 6 are fixed radial spokes or end pieces 7 of truncated sector form and properly spaced apart from each other. To the spokes 7 are fixed the filtering-frames proper, which, as shown, are made up of end pieces 8, outer end stretcher-strips 9, inner end stretcher-strips 10, partitions 11, and the filtering-cloths 12, properly stretched over the frames made up of the parts 8, 9, 10, and 11, as best shown in Figs. 3, 4, 5, and 6. The inner end pair 10 of the stretcher-strips are placed directly adjacent to each other, while the outer end pair of stretcher-strips 9 are spaced apart from each other. The successive pairs of stretcher-strips are spaced apart from each other circumferentially of the reel. Hence when the parts are all in working position the filtering-frames will be closed at their outer ends and open at their inner ends between the successive pairs or sets of inner stretcher-strips 10.

The reel made up of the hubs 6, radial arms or spokes 7, and the filtering-frames, just hereinbefore described, turns on the annular flanges 3 of the fixed frame-plates 2, and the upper or circular portions of said frame-plates constitute fixed closures to the central chamber A, surrounding the axis of the drum. The dust-laden air is admitted to this central chamber A under pressure through an air-trunk 13, which taps or extends through one of said frame-plates 2.

In the frame-brackets 4 are mounted a main driving-shaft 14, provided with a driving-pulley 15, a pinion 16, and a pair of beveled gears 17, and a sprocket-wheel 18. In said brackets 4 is also mounted a countershaft 19, provided with a gear 20 in mesh with the pinion 16 on the main shaft 14 and also provided with a pair of eccentric cams 21 and a pair of crank-disks 22, all as best shown in Figs. 1 and 2. The crank-disks 22 have pins 23 for operating hook-ended pawls or rods 24, the hook ends of which engage with teeth 25 on the hub 6 of the rotary reel. The pawl-rods 24 are properly shaped to afford rectangular strap-sections 24ª, which embrace the counter-shaft 19 and the pins 23 of the crank-disk 22. Hence under the rotary motion of the counter-shaft 19 the pins 23 will first move the pawl-rods 24 in one direction and then in another, much like an eccentric, thereby rotating the reel with an intermittent or step-by-step motion. The reel has as many teeth 25 on its hub 6 as it has filtering-frames or spokes 7, and the throw imparted by the pawl-rods 24 is sufficient to bring one filtering frame or pocket after the other into cleaning position, as will later appear.

To the main shaft 14 are pivoted a pair of angular bearing-brackets 26, the vertical arms of which have broadened or expanded faces which rest or bear against the cams 21, carried by the counter-shaft 19, as best shown in Figs. 1 and 2. In the horizontal arms of the angular bearing-brackets 26 are mounted shafts 27, provided with beveled pinions 28, which engage with the beveled gear 17, carried by the main shaft 14. The shafts 27 are free to slide each in its beveled pinion 28, while connected thereto for rotation thereby. Otherwise stated, the shafts 27 are shown as provided with grooves $b$, and the hubs of the beveled pinions 28 are provided with set-screws $b'$, the inner ends of which engage with the grooves $b$ and the shafts 27, as best shown in Figs. 8 and 9.

The shafts 27 are provided with yokes 29 of proper shape to overarch eccentrics 30, fixed to the inner ends of the shafts 27, as best shown in Figs. 1 and 9. The yokes 29 are provided with pins 31, which work in the slotted guide-brackets 5, as best shown in Figs. 1 and 8. In the outer ends of the yokes 29 is mounted the cleaner-shaft 32, which has fixed thereto a series of loop-like beaters 33, composed of leather or other comparatively stiff but slightly-flexible material. To the shaft 32 are fixed open or incomplete eccentric-straps 34, which embrace the eccentrics 30 on the ends of the shafts 27. Hence under the rotary motion imparted by the shafts 27 the cleaner-shaft 32, with its loops 33, will receive a rocking motion under the action of the eccentrics 30 and the straps 34. The parts are so proportioned that when any given set of pockets or filtering-tubes are in cleaning position and the reel is standing stationary the cleaner-shaft 32 will extend between the walls of two adjacent pockets, as is obvious from an inspection of Figs. 1 and 6. The cleaner will also during said time receive a bodily vertical movement under the action of the cams 21 on the counter-shaft 19 in a manner which may best be understood from an inspection of Figs. 1 and 2. The bearing-brackets 26 being pivoted on the main shaft 14, it is obvious that under the rotation of the counter-shaft 19 the cams 21 will impart an angular motion to the brackets 26, and thereby move the yokes 29 and all the parts carried thereby up and down in the vertical plane or lengthwise of the guide-brackets 5. The cleaner will thereby be moved from the outermost to the innermost limit of the space between two adjacent filtering-pockets and will finally be lifted to a point completely above the reel and into guide-keepers 35, properly supported from an overhanging arm or projecting parts of the brackets 5. The sliding of the shafts 27 in the hubs of the pinions 28 permits the right-line vertical motion of the yokes 29 and the cleaner-shaft 32, while the bearing-brackets 26 move in the arc of a circle under the action of the cams 21 on the counter-shaft 19. It is of course obvious that the weight of the parts carried by the bearing-brackets 26 tends to bring the same always into a lowermost position as rapidly as permitted by the cams 21.

In the highest part of the central chamber A and fixed to the frame-plates 2 is located a cut-off deck 36, a back-draft chamber 37, and a collecting-trough 38. The back-draft chamber 37 is provided with a conveyer 37ª for conducting off any material which may accumulate therein to a delivery-spout 37ᵇ. The collecting-chamber 38 is provided with a similar conveyer 38ª for conducting off the dust collected therein to a similar off-leading chute 38ᵇ. Both of said conveyers are driven from the sprocket 18 on the main shaft 14 by chain 39, engaging sprockets 37ᶜ and 38ᶜ on said conveyer-shafts, as best shown in Fig. 1.

The deck 36 entirely overreaches and closes the back-draft chamber 37 and partly overreaches and partly closes the collecting-chamber 38. The deck 36 is of the proper shape and location to make when properly packed a close joint with the inner end stretcher-strips 10 and the hubs 6 of the rotary reel, and thereby cut off the blast from the inner ends or mouths of such of the filtering-pockets as may be directly over the said deck 36.

The partitions 11 in the filtering-frames are provided with air-passages 11ª near their outer ends and coöperate with the end pieces 8 to afford passages or compartments 11ᵇ, which are open at their lower end and are adapted to register with openings 11ᶜ in that portion of the deck 36 which covers the back-draft chamber 37, as may be best seen in Fig. 3.

A tube (not shown) taps the back-draft chamber 37 at the point or nipple 40 and leads either back to the eye of the main fan, which supplies the dust-laden air under pressure, or to a small fan independent of the main fan, properly located and used for that purpose only.

With the construction above described the action in respect to the back-draft chamber and the collecting-chambers and the deck 36 is as follows: When the filtering-pockets are brought into cleaning position, the reel is of course stationary, as before stated. Two sets of pockets will then stand directly over that part of the deck 36 which overlies the back-draft chamber 37, and the blast and dust-laden air from the central chamber A will be entirely cut off from the mouths of the said pockets; but as the back-draft passage 11ᵇ in the filtering frames or pockets will then be in registration with the corresponding openings 11ᶜ in the back-draft chamber 37 a back draft will be produced on the filtering-pockets by the fan, (not shown,) which is piped or connected to the nipple 40 of the back-draft chamber 37. This of course will pull back clean air from the atmosphere through the filtering-cloths 12 in a direction reversely to that taken by the air, which passes from the chamber A into the mouths of the pockets when the dust-laden blast is not cut off therefrom. At the same time that this back draft from the chamber 37 is acting on the filtering-cloths the cleaner-shaft 32 with its beater-loops 33 will be in action on the cloths, beating the same under the rocking motion of said parts and striking the whole of the same under the bodily or up-and-down traveling motion of the cleaner. As the result of the back draft and the beating and cleaning action from the cleaner, the dust will be thoroughly shaken out from the filtering-cloths and will fall onto the deck 36. Then under the next step of the reel's motion the dust which has fallen onto the deck 36 will be scraped off by the inner sets of stretcher-strips 10 and be forced into the open mouth of the collecting-trough 38. These actions occur in succession in respect to succeeding sets of filtering-pockets, and in this way the pockets are kept thoroughly clean.

It should be especially noted that in this machine the back draft is not applied to the collecting-trough 38. With equal emphasis it should be noted that the dust which is knocked out from the filtering-pockets does not fall into the back-draft chamber 37. The only dust which gets into the back-draft chamber 37 is the small amount which may be pulled with the back draft through the openings 11ᵃ and the passages 11ᵇ and 11ᶜ with the current of air drawn back therethrough into the chamber 37.

When the cleaning device has completed its work, it is lifted outward beyond the periphery of the rotary reel, as hitherto noted, by the upward movement of the bearing-brackets 26 under the actions of the cams 21. The cleaner-shaft 32, with its loops 33, will then enter the staple-like guide-keepers 35 until the drum or reel receives its next step of motion. By providing these staple-like guides 35 the proper entrance of the loops 33 of the cleaner into the spaces between the pockets is assured when the cleaner is lowered into working position. Without the guides 35 the loops 33 might strike the heads of the filtering-frames and cut or wear out the cloths.

It is of course obvious that the invention herein disclosed is capable of modification in construction without departing from the spirit of the invention.

One obvious modification is illustrated in Figs. 10, 11, and 12. In that modification the dust shaken out from the filtering-tubes when in cleaning position falls directly into the dust-collecting chamber 38 instead of onto the ledge or deck 36, as shown in the main views. For thus modifying the action a deck 41 is made of the proper construction to afford the necessary cut-off flanges at its opposite sides, while leaving a central opening in the deck, through which the dust may fall onto an inclined top piece 42, which covers the back-draft chamber 37, but delivers into the open upper end of the collecting-trough 38. The collecting-trough 38 is also provided with short covers 43 near its ends, reversely inclined and leading to the openings 11ᶜ of the back-draft chamber 37, thus permitting the communication between the back-draft chamber 37 and the back-draft passages 11ᵇ in the filtering-pockets. Hence the back draft will act on the pockets as before; but the dust shaken out from the pockets will fall directly into the collecting-chamber 38. The cleaner would act exactly the same as in the main views.

It should be especially noted that the cleaner herein disclosed rocks and does not rotate. The difference is highly important in point of results. A rotary cleaner, if non-elastic or rigid, will scrape and wear out the cloth of the collecting-pockets. Moreover, a rotary cleaner, if elastic or flexible, will wind around the shaft and become useless. A rotary cleaner, whether rigid or flexible, will have a pasting action on the stock, rubbing the same into the cloth, and thereby rendering that portion of the cloth useless for filtering purposes. Moreover, the current of air set up by a rotary cleaner is a positive disadvantage, as such of the current which passes through the cloth will carry the dust which is loosened up by the cleaner from the adjacent side of the pocket to the opposite side of the pocket and cause the same to lodge thereon, thereby reloading and overloading one side of the pocket, instead of assisting in the cleaning action, as is sometimes assumed. A rocking cleaner simply strikes the cloth with a hammer-like blow and has no scraping or wearing action on the cloth, no pasting action is produced on the stock, and there is no tendency to wind around the shaft, and can be made and is preferably made of substantially rigid material. It is relatively stiff or rigid, but may be slightly flexible or yielding, as hitherto stated, being composed of loop-like beaters formed of comparatively stiff leather. A rocking cleaner does not set up any current of air. It does not have a fan-like action, and hence there is no current of air forced by the rocking cleaner back through any wall of the pocket. The injurious effects due to the fan-like action of the rotary cleaner above noted are therefore entirely avoided, and the dust which is knocked by the cleaner falls directly down to the outlet from the pocket. It should further be noted that the rocking action is imparted to the cleaner by an eccentric, which travels radially with the cleaner. This is an important feature of construction, regardless of the means by which the eccentric is driven or carried.

What I claim, and desire to secure by Letters Patent of the United States, is as follows:

1. In a dust-collector, the combination with a rotary reel having a series of filtering-pockets spaced apart from each other, of a rocking cleaner mounted to work in the spaces between adjacent pockets, for action on the cloth with a hammer-like blow, means for bodily moving the cleaner radially in respect to said reel, to clean the walls of said pockets, and to a point above the pockets, for clearing the reel, and an eccentric for imparting the rocking motion to the cleaner, which eccentric moves radially with the cleaner, at all points of the cleaner's travel, substantially as described.

2. In a dust-collector, the combination with a rotary reel having a series of filtering-pockets spaced apart from each other, of a rocking cleaner mounted to rock in the space between adjacent pockets, means for rocking said cleaner to cause the same to strike the walls of the pockets, a lifting device for bodily moving said cleaner on a radial line between the pockets and to a point above the outer ends of the pockets, and overhanging guides for the beaters of the cleaner adapted to receive said beaters, when above the pockets and to guide the same back into working position between the pockets, which beater-guides are independent of the guides for the cleaner-shaft and the lifting device, substantially as described.

3. In a dust-collector, the combination with a rotary reel having a series of filtering-pockets spaced apart from each other, of a main shaft, a pair of bearing-brackets pivoted to said main shaft, a counter-shaft driven from said main shaft and having cams operative to angularly adjust said brackets, sliding shafts mounted on said bearing-brackets and geared to said main shaft, eccentrics on the end of said sliding shafts, yokes 29 on said sliding shafts overarching said eccentrics, a cleaner-shaft 32 mounted in said yokes 29 and provided with the open or incomplete eccentric-straps 34 engaging said eccentrics, and guides for said yokes 29, all for coöperation, substantially as described.

4. In a dust-collector of the balloon type, the combination with fixed bearing-heads, of a rotary reel having filtering-pockets mounted to turn on said heads and coöperating therewith to afford a central chamber, surrounding the axis of the drum, into which the dust-laden air is forced, under pressure, a cut-off device operative to cut off the dust-laden blast from the pockets in cleaning position, a collecting-trough for receiving the dust which is shaken out from the pockets, means for shaking the pockets from which the blast is cut off, and a back-draft chamber in communication with the pockets from which the blast is cut off and when subject to such shaking action, which back-draft chamber and which collecting-trough are independent of each other, substantially as described.

5. In a balloon dust-collector, the combination with stationary heads, of a rotary reel having filtering pockets, which reel is mounted to turn on said heads and coöperates therewith to afford a central chamber surrounding the axis of the drum into which the dust-laden air is forced under pressure, an imperforate cut-off deck within said central chamber operative to cut off the blast from the pockets above the deck and to receive the dust shaken out from the pockets in cleaning position, means for shaking the pockets from which the blast is cut off, a back-draft chamber beneath said deck, a dust-collector trough, and channels connecting said back-draft chamber with pockets from which the blast is cut off, which back-draft chamber and connecting-channels are independent of the dust-collecting trough, and which trough is independent of the back-draft devices and is operative to receive the dust from said cut-off deck under the next forward step of the reel's rotary motion, substantially as described.

In testimony whereof I affix my signature in presence of two witnesses.

EMIL R. DRAVER.

Witnesses:
 HENRY C. DRAVER,
 LOIS M. HENLEY.